United States Patent
Tsirkin (10) Patent No.: US 11,265,285 B2
(45) Date of Patent: Mar. 1, 2022

(54) FAN NETWORK MANAGEMENT

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 256 days.

(21) Appl. No.: 16/261,052

(22) Filed: Jan. 29, 2019

(65) Prior Publication Data

US 2019/0158454 A1 May 23, 2019

Related U.S. Application Data (63) Continuation of application No. 14/951,231, filed on Nov. 24, 2015, now Pat. No. 10,212,122.

(51) Int. Cl.
*H04L 29/12* (2006.01)
*H04L 61/103* (2022.01)
(Continued)

(52) U.S. Cl.
CPC ........ *H04L 61/103* (2013.01); *G06F 9/45558* (2013.01); *H04L 41/20* (2013.01);
(Continued)

(58) Field of Classification Search
CPC ... H04L 61/103; H04L 41/20; H04L 61/6022; H04L 61/6009; G06F 9/45558; G06F 2009/45583; G06F 2009/45595
See application file for complete search history.

(56) References Cited

U.S. PATENT DOCUMENTS 6,697,326 B1 * 2/2004 Britton .............. H04L 29/12009
370/218
6,889,095 B1 5/2005 Eidson et al.
(Continued)

FOREIGN PATENT DOCUMENTS

CN 101390339 3/2009

OTHER PUBLICATIONS

Shuttleworth, "Introducing the Fan—simpler container networking", http://insights.ubuntu.com/2015/06/24/introducing-the-fan-simpler-container-networking/, Canonical, Jun. 24, 2015 (4 pages).
(Continued)

*Primary Examiner* — Benjamin M Thieu
(74) *Attorney, Agent, or Firm* — K&L Gates LLP (57) ABSTRACT

A method performed by a physical computing system includes, with a first virtual entity manager of a first host machine, detecting an Address Resolution Protocol (ARP) request from a first virtual entity supported by the first virtual entity manager to a second virtual entity having a first logical address within a fan network. The method further includes, with the first virtual entity manager, translating the first logical address to a second logical address and transmitting the ARP request to a second host machine using a physical address resolved from the second logical address, the second host machine supporting the second virtual entity. The method further includes receiving a response to the ARP request, the response including a virtualized physical address of the second virtual entity. The method further includes with the first virtual entity manager, forwarding a data packet from the first virtual entity to the virtualized physical address.

20 Claims, 4 Drawing Sheets

(51) Int. Cl.
    *H04L 41/00*     (2022.01)
    *G06F 9/455*     (2018.01)
    *H04L 101/622*     (2022.01)
    *H04L 61/58*     (2022.01)

(52) U.S. Cl.
    CPC ............... *H04L 61/6022* (2013.01); *G06F 2009/45583* (2013.01); *G06F 2009/45595* (2013.01); *H04L 61/6009* (2013.01)

(56) References Cited

U.S. PATENT DOCUMENTS

| | | | | |
|---|---|---|---|---|
| 8,359,376 | B1* | 1/2013 | Yalagandula | H04L 61/103 709/221 |
| 9,021,092 | B2 | 4/2015 | Silva et al. | |
| 9,210,079 | B2* | 12/2015 | Sridhar | H04L 12/413 |
| 2003/0069993 | A1* | 4/2003 | Na | H04L 29/12018 709/245 |
| 2009/0044276 | A1* | 2/2009 | Abdel-Aziz | H04L 63/145 726/24 |
| 2010/0011139 | A1* | 1/2010 | Wang | G06F 13/4221 710/110 |
| 2010/0080227 | A1* | 4/2010 | Kang | H04L 12/4625 370/392 |
| 2010/0272107 | A1* | 10/2010 | Papp | H04L 29/12028 370/392 |
| 2014/0025770 | A1* | 1/2014 | Warfield | G06F 16/256 709/213 |
| 2014/0229945 | A1 | 8/2014 | Barkai et al. | |
| 2014/0280835 | A1 | 9/2014 | Pruss et al. | |
| 2015/0071289 | A1 | 3/2015 | Shin et al. | |
| 2015/0112933 | A1 | 4/2015 | Satapathy | |
| 2015/0172222 | A1 | 6/2015 | Liao et al. | |
| 2015/0281067 | A1 | 10/2015 | Wu | |
| 2015/0326475 | A1* | 11/2015 | Cj | H04L 45/74 370/392 |
| 2016/0337236 | A1* | 11/2016 | Hsu | H04L 29/12028 |
| 2017/0093758 | A1* | 3/2017 | Chanda | H04L 49/35 |
| 2017/0118067 | A1* | 4/2017 | Vedula | H04L 61/103 |
| 2017/0118171 | A1 | 4/2017 | Wu | |

OTHER PUBLICATIONS

Flockport.com, "Simplify Container Networking in the Cloud with Ubuntu's New Fan Project", https://www.flockport.com/simplify-container-networking-with-unbuntu-fan-project/, Jul. 14, 2015 (12 pages).

Kirkland, Container-to-Container Networking: The Bits have Hit the Fan!: http://blog.dustinkirkland.com2015/06/the-bits-have-hit-the-fan.html, Canonical Ltd., Jun. 22, 2015 (11 pages).

Burke, "Container Networking: How does Docker Related to SDN?", http://searchsdn.techtarget.com/answer/Container-networking-How-does-Docker-relate-to-SDN, Nemertes Research (4 pages).

Project Calico, "A Pure Layer 3 Approach to Virtual Networking for Highly Scalable Data Centers", http://www.projectcalico.org/, 2015 (5 pages).

Perman, "Tutorial on Network Layers 2 and 3", https://www.ietf.org/edu/documents/82-RoutingBridgingSwitching-Perlman.pdf. Intel Labs (145 pages).

Ubuntu Wiki, "Ubuntu's Fan Networking: User Documents", https://wiki/unbuntu/com/FanNetworking?action=print, Jun. 22, 2015 (9 pages).

* cited by examiner

FAN NETWORK MANAGEMENT

CROSS REFERENCES TO RELATED APPLICATIONS

This application is a continuation of and claims priority to and the benefit of U.S. patent application Ser. No. 14/951,231, filed on Nov. 24, 2015, the entire content of which is hereby incorporated by reference.

BACKGROUND

The present disclosure relates generally to virtual computing systems, and more particularly, use of physical Peripheral Component Interconnect (PCI) devices for virtual computing systems.

A host machine (e.g., computer or server) is a computing system that is typically enabled to simultaneously run one or more virtual machines, where each virtual machine may be used by a local or remote client. The host machine allocates a certain amount of execution time from the host's physical processors to each of the virtual processors. Each virtual machine may use the allocated resources to execute applications, including operating systems known as guest operating systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

Like with a physical machine, a virtual machine may be identified on a network by a logical address (e.g., an Internet Protocol (IP) address) and a physical address (e.g., a Media Access Control (MAC) address). As use of virtual machines increases, the logical addresses available for use by such virtual machines decreases. This may be particularly problematic for IPv4 address spaces. One mechanism that may be used to allow for more logical addresses is fan networking. Fan networking involves trading the ability to route to a larger network (such as a /8 network) by providing additional IP addresses (e.g., an additional 253 IP addresses for a /8 network) behind a number of host IP addresses. It is desirable to use such mechanisms in an efficient manner.

SUMMARY

According to one example, a method performed by a physical computing system includes, with a first virtual entity manager of a first host machine, detecting an Address Resolution Protocol (ARP) request from a first virtual entity supported by the first virtual entity manager to a second virtual entity having a first Internet Protocol (IP) address within a fan network, translating the first IP address to a second IP address, resolving the second IP address into a Media Access Control (MAC) address of a second host machine that supports the second virtual entity, transmitting the ARP request to the second host machine, with the second host machine, transmitting the ARP request to one or more virtual entities connected to a fan switch of the second host machine, with the first virtual entity, receiving a response to the ARP request, the response including a virtualized MAC address of the second virtual entity, and with the first virtual entity manager, forwarding a data packet from the first virtual entity to the virtualized MAC address.

According to one example, a method performed by a physical computing system includes, with a first virtual entity manager of a first host machine, detecting an Address Resolution Protocol (ARP) request from a first virtual entity supported by the first virtual entity manager to a second virtual entity having a first logical address within a fan network. The method further includes, with the first virtual entity manager, translating the first logical address to a second logical address and transmitting the ARP request to a second host machine using a physical address resolved from the second logical address, the second host machine supporting the second virtual entity. The method further includes receiving a response to the ARP request, the response including a virtualized physical address of the second virtual entity. The method further includes with the first virtual entity manager, forwarding a data packet from the first virtual entity to the virtualized physical address.

According to one example, a method performed by a physical computing system includes, with a host machine, supporting a fan network to a plurality of virtual entities, with the host machine, receiving a unicast Address Resolution Protocol (ARP) request from a source virtual entity supported by a source virtual entity manager, the ARP request having a destination logical address corresponding to a destination virtual entity supported by the host machine, with the host machine, transmitting the ARP request to one or more virtual entities connected on the fan network and supported by the host machine, and with the host machine, forwarding a response to the ARP request to the source virtual entity, the response including a virtualized physical address of the destination virtual entity.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, fan networking involves trading the ability to route to a larger network (such as a /8 network) by providing additional IP addresses (e.g., an additional 253 IP addresses for a /8 network) behind a number of host IP addresses. An IP address is a 32 bit number that is typically represented as four octets in dot-decimal form (e.g. 192.168.0.1). The most significant bits represent the network number portion (sometimes referred to as the network prefix) and the least significant bits represent the host number portion. The entire IP address space can be divided into subnetworks. A subnetwork is a logical subdivision of an IP network. Addresses that belong on the same subnetwork have the same network prefix. A particular subnetwork range is denoted by the first IP address within that range followed by a '/' character, followed by the number of bits in the network prefix. For example, the denotation 10.0.0.0/8 refers to a subnetwork having a network prefix of 10 and a range between 10.0.0.0 and 10.255.255.255. In a further example, the denotation 172.16.0.0/16 refers to a subnetwork having the network prefix as 172.16 and a range of 172.16.0.0 to 172.16.255.255.

Fan networking involves sacrificing the ability to route to a network having a larger address range (e.g., 10.0.0.0/8) so that additional IP addresses can be associated with an IP address of a smaller address range (e.g. 172.16.0.0/16). The larger network may be referred to as the overlay network and the smaller network may be referred to as the underlay network. In one example, a host machine may have an IP address of 172.16.5.6 within the underlay network. Each virtual machine supported by the host machine may be part of a fan network and have an IP address on the fan network denoted by the address range of 10.5.6.0/24. Thus, in one example, to send a packet to a destination address of 10.5.6.53 (a destination on the fan network) the packet is encapsulated with a destination IP address of 172.16.5.6 (the destination address of the host machine). The host machine can then unwrap the packet and forward the original packet to its destination of 10.5.6.53. This overhead, however, can cause issues as described above.

According to principles described herein, to avoid such overhead, Address Resolution Protocol (ARP) packets destined for an entity within a fan network are modified. ARP is a protocol used to resolve logical addresses into physical addresses. In other words, ARP is used to resolve a network layer (level 3) address to a data link layer (level 2) address. For example, ARP may be used to resolve an IP address to a MAC address.

In conventional use of ARP, when the machine A wishes to send data to a machine B, and machine A has the IP address for machine B, it first checks an ARP table to see if it already knows the MAC address for machine B. If it does know the MAC address for machine B, then it can send data on the level 2 framework to that MAC address. If, however, machine A does not know machine B's MAC address, it sends out an ARP request via broadcast on the network. Thus, the ARP request is sent to each machine on the network. When machines other than machine B receive this ARP request, they will ignore it. However, when machine B receives this ARP request, it will respond to machine A with, among other things, its MAC address.

Using principles described herein, a first hypervisor that supports a first virtual machine detects that an ARP request destined for a second virtual machine supported by a second hypervisor. The first hypervisor and first virtual machine may be referred to as the source hypervisor and the source virtual machine, respectively. Additionally, the second hypervisor and the second virtual machine may be referred to as the destination hypervisor and the destination virtual machine, respectively. The source hypervisor also detects that the destination virtual machine is on a fan network. Instead of broadcasting the ARP request, the source hypervisor transmits the ARP request to the host machine that supports the destination hypervisor. Upon receipt of the ARP request, the host machine then forwards the ARP request to one or more entities on the fan network. In one example, the ARP request is broadcast on the local fan switch. The machines to which the ARP request is not directed can simply ignore the ARP request. The destination virtual machine, however, may respond to the ARP request as normal. This will cause the ARP table of the source virtual machine to be updated. Thus, to send a data packet from the source virtual machine to the destination virtual machine, the source virtual machine can use the ARP table and forward the data packet based on the virtualized MAC address of the virtual machine. As will be described in further detail below, these principles can be applied to containers as well.

Using principles described herein, network communication between virtual machines on a fan network and operate more efficiently. For example, most packets on the data path do not have to be encapsulated using the fan logic. By having less encapsulation of packets, there is less MTU segmentation and fewer extra data packets being sent. This reduces latency and improves throughput. In some examples, performance may approach that of bare metal networking.

Figure 1:
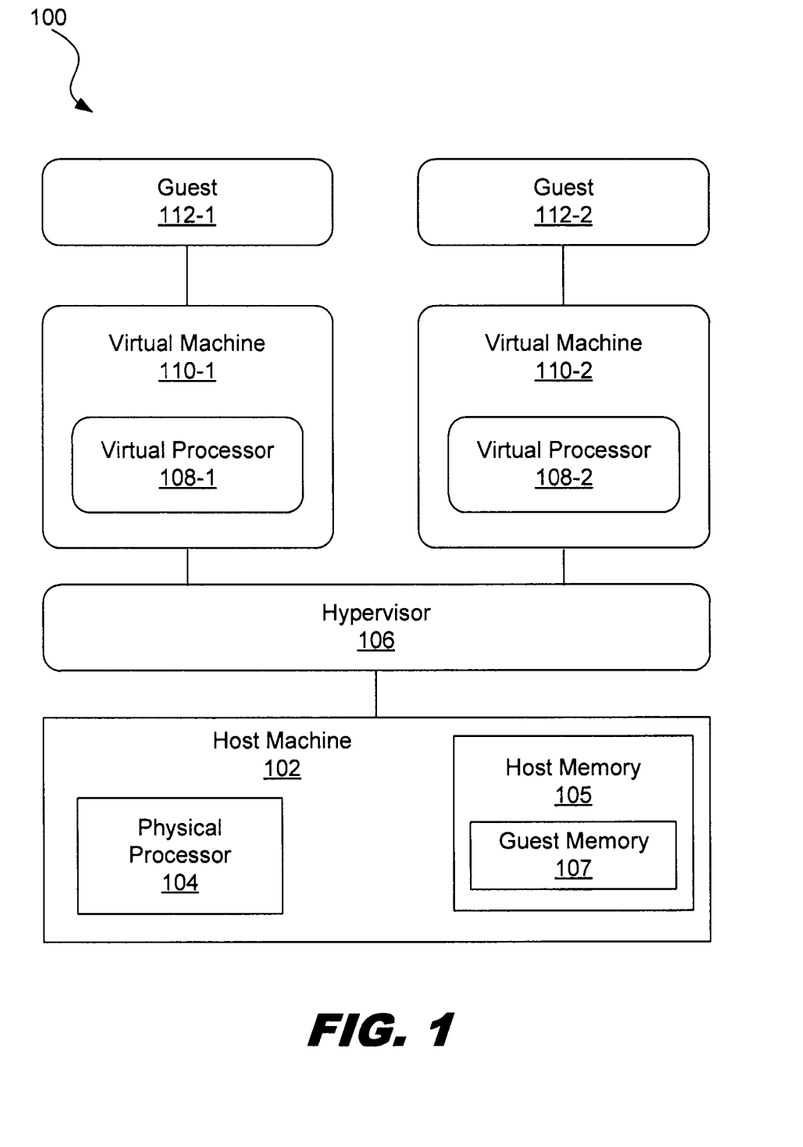
FIG. 1 is a diagram showing an illustrative host machine running a plurality of virtual machines, according to one example of principles described herein.

FIG. 1 is a diagram showing an illustrative system 100 involving a plurality of virtual machines 110. According to the present example, a physical system, such as a host machine 102 includes hardware such as a processor 104 and a host memory 105. The system 100 also includes a hypervisor 106. The hypervisor 106 supports a first virtual machine 110-1 and a second virtual machine 110-2. Although two virtual machines 110 are illustrated, other examples including fewer than two virtual machines or more than two virtual machines are within the scope of the present disclosure. The virtual machines provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 refers to the working memory of the host machine 102. Working memory is typically Random Access Memory (RAM) and is designed for speed. Working memory is often a volatile form of memory, meaning that it loses its data when power is no longer supplied. The host machine 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The host memory 105 may designate various blocks of memory for use by the hypervisor 106 or for use by the guests 112 using the virtual machines 110. These blocks of memory may be ranges of physical memory addresses or virtual memory addresses.

A certain portion of the host memory 105 is dedicated to guest memory 107. The total guest memory 107 may be made available for multiple guests 112 to use. As described above, the guest memory may be divided into different regions or modules, each module associated with a different virtual machine.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests. In an example, the hypervisor 106 presents a virtual machine that includes a virtual set of Central Processing Unit (CPU), memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

To facilitate multiple virtual machines 110 simultaneously, hardware resources are shared among the hypervisor 106 and one or more guests 112. The physical processors 104 of the host machines enter and exit the context of different virtual processors 108 and the hypervisor 106. A virtual machine exit marks the point at which a context switch occurs between the virtual processor 108 currently running and the hypervisor 106, which takes over control for a particular reason. During the context switch, the processor 104 may save a snapshot of the state of the virtual processor that was running at the time of exit. The virtual machine exit is handled by the hypervisor 106, which decides the appropriate action to take and then transfers control back to the virtual processor 108 via a virtual machine entry. A virtual machine entry marks the point at which a context switch occurs between the hypervisor 106 and a virtual processor 108, which takes over control.

The host machine 102 is in communication with a management system 114. The management system 114 manages multiple virtual machines (similar to virtual machines 110) running on multiple host machines (similar to host machine 102). For example, the management system 114 may determine if a new virtual machine is needed and cause one of the host machines to provision a new virtual machine. The management system 114 may also specify various characteristics of that virtual machine. The management system 114 may also tear down virtual machines that are no longer needed.

Figure 2:
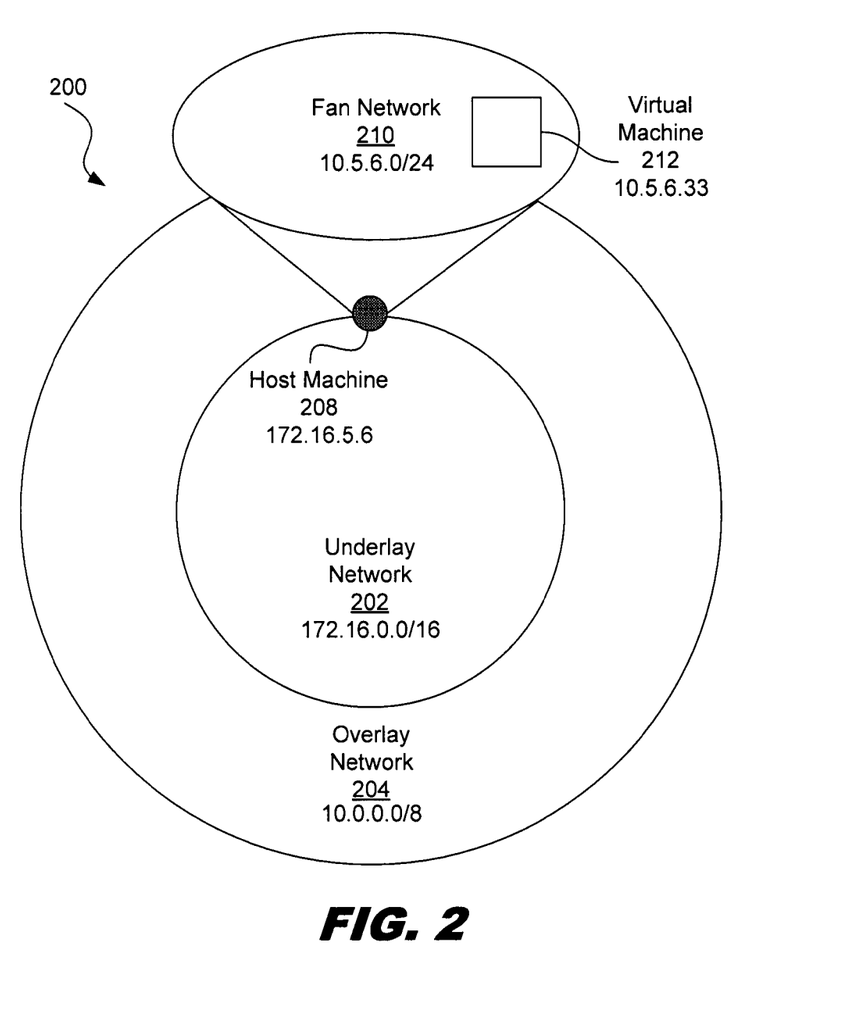
FIG. 2 is a diagram showing an illustrative fan network, according to one example of principles described herein.

FIG. 2 is a diagram showing fan networking 200. As described above, a fan network 210 trades routing to an overlay network 204 to provide additional IP addresses behind an IP address of an underlay network 202. In the present example, the overlay network 204 to which routing is sacrificed has an address range denoted by 10.0.0.0/8. The underlay network 202 has an address range denoted by 172.16.0.0/16. In one example, a host machine 208 within the underlay network 202 has an IP address of 172.16.5.6. The virtual machines supported by the host machine may each have an IP address within a range denoted by 10.5.6.0/24. For example, a virtual machine 212 may have an IP address of 10.5.6.33. In other words, an additional 253 IP addresses are available for virtual machines, or containers, supported by the host machine 208. The examples of /8 and /16 networks are provided as one example. Other sizes of networks may also be used in accordance with principles described herein.

As described above, conventional transmission of packets on a fan network involves encapsulation. In one example, a packet is destined for the virtual machine 212 on the fan network 210 with an IP address of 10.5.6.33. This packet is then encapsulated with the packet destined for the host machine 208 that supports the virtual machine 212. The host machine has an IP address of 172.16.5.6. In the present example, translation of the destination IP address of the virtual machine 212 to the IP address of the host machine uses a simple function. Specifically, a portion (i.e., 5.6) of the network identifier of the fan network (i.e., 10.5.6) excluding the network identifier of the overlay network (i.e., 10) is used as the host portion of the IP address for the host machine 208. Thus, 10.5.6.33 becomes 172.16.5.6. The logic used to make this translation may be referred to as the fan logic. The fan logic is used to encapsulate a packet destined for 10.5.6.33 within a larger packet destined for 172.16.5.6. Upon arriving at the host machine 208, the packet is unwrapped to expose the original destination IP address of 10.5.6.33. The host machine may then provide the packet to the virtual machine having the IP address of 10.5.6.33.

For entities that are not part of the fan network, communication is unaffected. In other words, communication between entities that are not part of the fan network does not involve the additional overhead described above. Additionally, entities that are not part of the fan can communicate with the subnetworks that are excluded by the fan network. Furthermore, in some examples, a particular network may have multiple fans. Each fan may exclude a different subnetwork to provide additional IP addresses for an IP address of the underlay network.

In some examples, a fan network can be implemented using Software Defined Networking (SDN). SDN is an approach to networking that separates the control plane from the data plane. For example, while conventional networking may include several independently configured routers, a system implementing SDN may include a central management component that makes decisions as to where traffic should be sent and then directs underlying systems to route network traffic as appropriate. SDN concepts can be used in the physical networks that interconnect the physical computing systems that support virtual machines. Additionally, SDN concepts can be used in virtual networks used to connect various virtual machines to each other.

Figure 3:
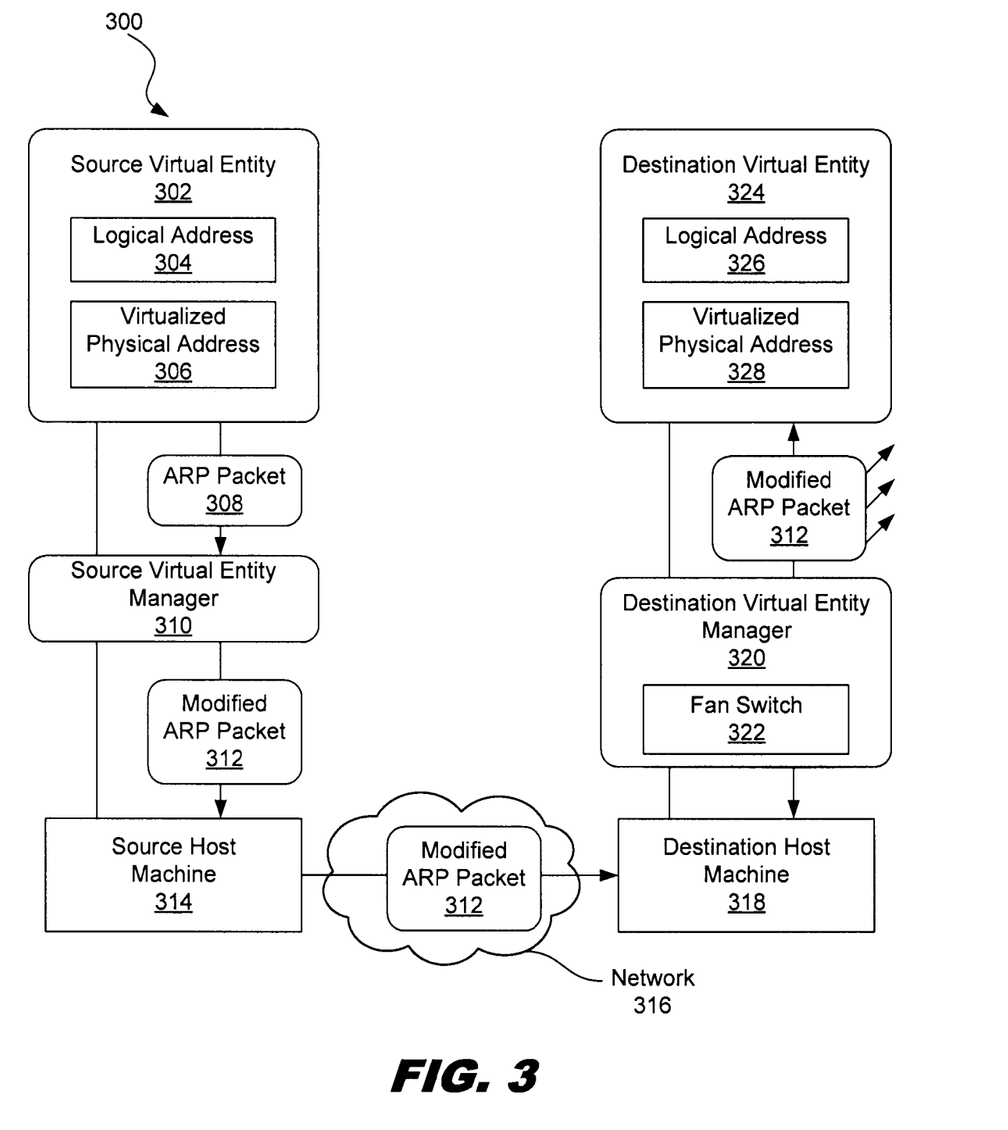
FIG. 3 is a diagram showing an illustrative path of an Address Resolution Protocol (ARP) request, according to one example of principles described herein.

FIG. 3 is a diagram showing an illustrative path 300 of an Address Resolution Protocol (ARP) request. According to the present example, a source virtual entity 302 intends to communicate with a destination virtual entity 324. The source virtual entity 302 is supported by a source virtual entity manager 310. Similarly, the destination virtual entity 324 is supported by a destination virtual entity manager 320. In the present example, a virtual entity may be either a virtual machine or a container. For the case in which the virtual entities 302, 324 are virtual machines, the virtual entity managers 310, 320 are hypervisors that provide virtualized resources that are then made available to guest operating systems of the virtual entities 302, 324. For the case in which the virtual entities 302, 324 are containers, the virtual entity managers 310, 320 may be part of the host operating system. For example, the virtual entity managers 310, 320 may be a function of their respective host operating systems that creates multiple, isolated user-spaces. Each isolated user-space is referred to as a container. Like an individual virtual machine, a container can be addressed with a logical address such as an IP address as well as a virtualized physical address such as a MAC address.

The source virtual entity 310 is identified by a logical address 304 and a virtualized physical address 306. The logical address refers to a level 3 address and the virtualized physical address refers to a level 2 address. In one example, the logical address 304 is an IP address, particularly an IPv4 address. In one example, the virtualized physical address 306 is a MAC address.

When the source virtual entity 302 intends to send the data packets to destination virtual entity 324, it may have only the logical address 326 of the destination virtual entity 324. Thus, to obtain the virtualized physical address 328 of the destination virtual entity 324, the source virtual entity checks its own ARP table. As described above, the ARP table maintains a correlation between logical addresses and physical addresses for various entities on the network. If it is determined that the ARP table does not include an entry for the destination virtual entity, the virtualized physical address 328 for the destination virtual entity will have to be obtained. This is done by sending an ARP request via an ARP packet 308.

The ARP packet 308 is received by the source virtual entity manager. In the present example, the source virtual entity manager 310 is the virtual entity manager that supports the source virtual entity 302. Thus, the source virtual entity manager 310 is a piece of software that provides virtual resources to the source virtual entity 302. Conventionally, the source virtual entity manager 310 would process the ARP packet by broadcasting over the network 316. However, according to principles described herein, the source virtual entity manager 310 examines the destination logical address 326 of the ARP packet to determine whether the destination logical address 326 is associated with an entity on the fan network. This may be done in a variety of manners. In one example, the source virtual entity manager 310 may be provided with a number of IP address ranges that correspond to fan networks. The virtual entity manager 310 may check the destination logical address 326 with those ranges to determine whether the destination logical address is to an entity within the fan network.

If it is determined by the source virtual entity manager 310 that the destination logical address 326 is on the fan network, the ARP packet 308 will be modified. Specifically, instead of being configured as a broadcast packet, the destination IP address of the ARP packet 308 will be translated based on the fan logic. In other words, the destination IP address will be changed to be that of the destination host machine 318 instead of the destination virtual entity 324. The destination IP address of the host machine is then resolved to the physical address of the destination host machine (e.g., the MAC address of the destination host machine. The destination host machine 318 is the host machine that supports the destination virtual entity 324.

The modified ARP packet 312 is then sent from the source host machine 314 to the destination host machine 318 over the network 316. The modified ARP packet may be sent only to the destination host machine 318. The destination virtual entity manager 320 running on the destination host machine 318 then processes the modified ARP packet 312. Specifically, the destination virtual entity manager 320 may then broadcast that modified ARP packet 312 on the local fan switch 322. A packet that is broadcast is sent to each entity on the network over which it is broadcasted. Thus, in the case that the packet is broadcast on the fan switch 322, it is sent to each virtual entity connected to the fan switch 322.

In one example, the modified ARP packet 312 is broadcast to all virtual entities on the fan network through the fan switch 322. The fan switch 322 may emulate a network switch. In other words, the fan switch 322 may be a software module associated with the destination virtual entity manager 320 that processes packets destined for virtual entities on the fan network associated with the destination host machine 318. The fan switch 322 may process such packets in a manner similar to that of a physical network switch.

Upon receipt of the modified ARP packet 312, the destination virtual entity 324 may respond to the ARP request as usual. In other words, the destination virtual entity 324 responds with an ARP response packet that provides the source virtual entity 302 with the virtualized physical address 328 of the destination virtual entity 324. The source virtual entity 302 can then use that information to update its ARP table. Any future communication from the source virtual entity 302 to the destination virtual entity 324 can then be accomplished using the level 2 framework without encapsulating normal data packets. Data packets are non-ARP packets that carry data intended to be transferred between entities. In one example, a data packet is an IP packet.

Using principles described herein, data packets do not have to be modified at all. In other words, data packets do not have to be encapsulated as typically done with fan networks. Instead, the data packets can be handled using level 2 forwarding. Thus, data packets can be handled more efficiently. In some cases, processing the data packets can be accelerated by hardware designed to efficiently implement level 2 forwarding. Principles described herein are thus well suited for implementation by SDN.

Figure 4:
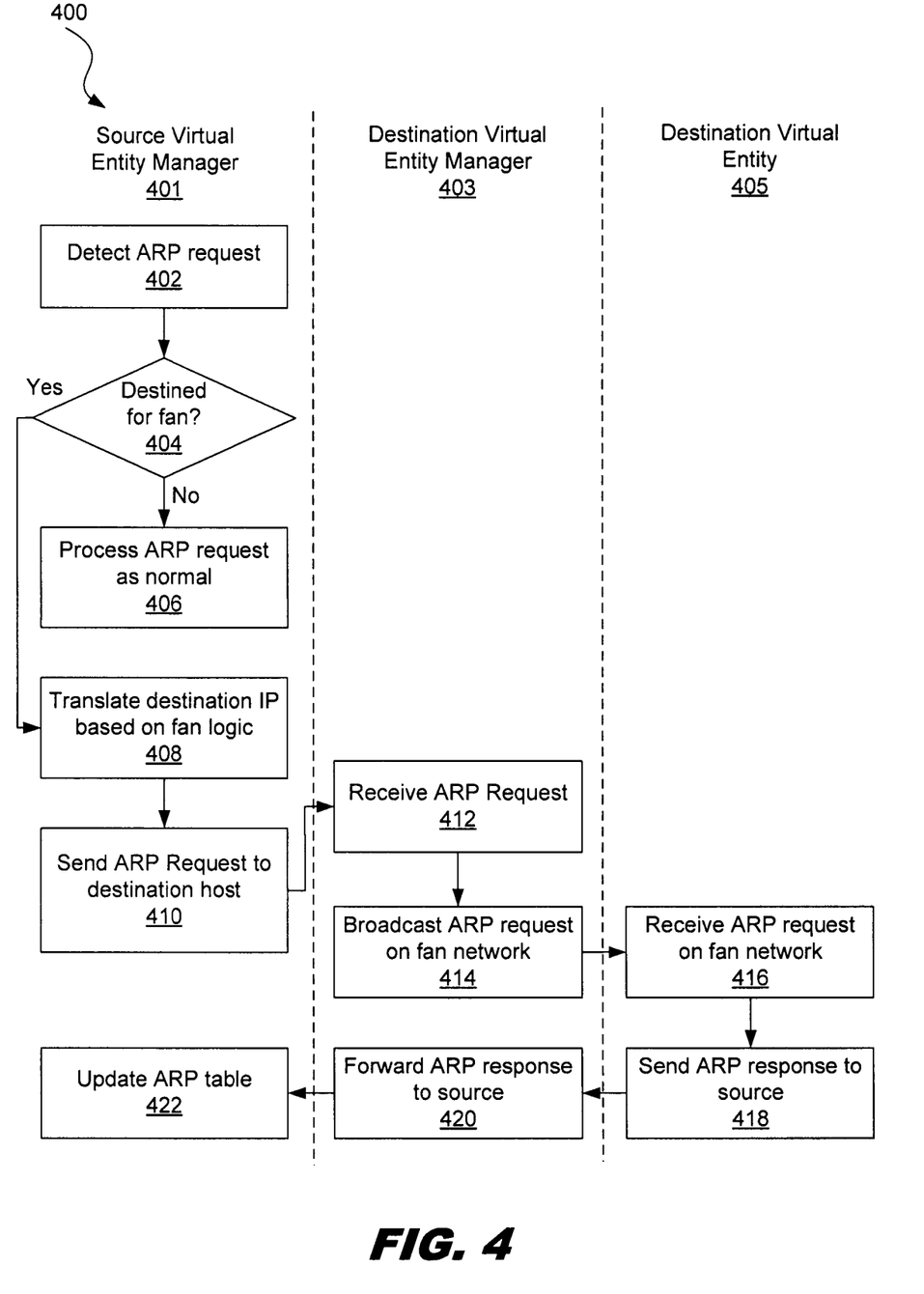
FIG. 4 is a flowchart showing an illustrative method for fan network management, according to one example of principles described herein.

FIG. 4 is a flowchart showing an illustrative method 400 for fan network management. The method 400 includes steps performed by a source virtual entity manager 401, a destination virtual entity manager 403, and a destination virtual entity 405. The source virtual entity manager 401 supports a source virtual entity that sends an ARP request to the destination virtual entity 405. Similarly, the destination virtual entity manager 403 supports the destination virtual entity 405. The source virtual entity manager runs on a source host machine. The destination virtual entity manager runs on a destination host machine. As described above, for the case in which the destination virtual entity 405 is a virtual machine, then the destination virtual entity manager 403 is a hypervisor. For the case in which the destination virtual entity 405 is a container, then the destination virtual entity manager 403 is part of the operating system of the destination host machine.

According to the present example, the method 400 includes a step 402 for detecting an ARP request. In one example, when a source virtual entity supported by the source virtual entity manager 401 sends an ARP request to the destination virtual entity, the source virtual entity manager 401 detects the ARP request.

At step 404, it is determined whether the ARP request is destined for a virtual entity on a fan network. For example, the source virtual entity manager 401 may determine whether the ARP request is destined for an entity on the fan network. If it is determined that the ARP request is not destined for an entity on the fan network, then the method proceeds to step 406 at which the ARP request is processed as normal.

If however, it is determined that the ARP request is destined for an entity within the fan network, the method 400 proceeds to step 408 at which the ARP request is modified. Specifically, the destination IP address is modified based on the fan logic. For example, using the example described above, a destination IP address of 10.5.6.33 may be changed to 172.16.5.6.

At step 410, the source entity 401 sends the ARP request to the destination host machine. This may be done by resolving the IP address of the destination host machine to the MAC address of the destination host machine. Unlike conventional ARP requests that are broadcast by the sending entity, the modified ARP requests is sent only to the host machine that supports the destination virtual entity.

At step 412, the destination virtual entity manager 403 receives the ARP request. More specifically, the destination host machine receives the ARP request. The ARP request may then be processed by the destination virtual entity manager 403.

At step 414, the destination virtual entity manager 403 broadcasts the ARP request on the fan network. In one example, the ARP request is broadcast on the local fan switch. All of the virtual entities connected to the local fan switch to which the ARP request is not directed may simply ignore the ARP request.

At step 416, the destination virtual entity 405 to which the ARP request is directed receives the ARP request that is broadcast on the fan switch. The destination virtual entity 405 responds to the ARP request as normal. At step 418, the destination virtual entity 405 sends the ARP response back to the source.

The ARP response may be processed by the destination virtual entity manager 403. Thus, the destination virtual entity manager forwards the ARP response back to the source at step 420. Upon receiving the ARP response, the source virtual entity manager 401 updates its ARP table at step 422. Thus, when data packets are sent to the IP address of the destination entity, they are forwarded using the level 2 framework to the destination virtualized physical address indicated in the ARP table.

Using principles described herein, network communication between virtual machines on a fan network and operate more efficiently. For example, most packets on the data path do not have to be encapsulated using the fan logic. By having less modification of packets, there is less MTU segmentation and fewer extra data packets being sent. This reduces latency and improves throughput. In some examples, performance may approach that of bare metal networking.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a host machine, receiving a unicast Address Resolution Protocol (ARP) request from a source virtual entity supported by a source virtual entity manager, the ARP request indicating a logical address corresponding to the host machine, the host machine associated with a destination logical address corresponding to a destination virtual entity supported by the host machine;
   with the host machine, determining a virtualized physical address responsive to the ARP request, the virtualized physical address identifying the destination virtual entity supported by the host machine; and
   with the host machine, forwarding a response to the ARP request to the source virtual entity, the response including the virtualized physical address of the destination virtual entity.

2. The method of claim 1, wherein the source virtual entity comprises a virtual machine.

3. The method of claim 1, wherein the source virtual entity comprises a container.

4. The method of claim 1, wherein the destination virtual entity comprises a virtual machine.

5. The method of claim 1, wherein the destination virtual entity comprises a container.

6. The method of claim 1, wherein the destination logical address is an IP address.

7. The method of claim 1, wherein the virtualized physical address is a MAC address.

8. The method of claim 1, further comprising transmitting the ARP request to one or more virtual entities.

9. The method of claim 1, wherein the destination logical address is encapsulated.

10. The method of claim 1, wherein the source virtual entity manager translates the destination logical address.

11. The method of claim 1, wherein the destination logical address is associated with an entity on a fan network.

12. The method of claim 11, further comprising, responsive to determining by the source virtual entity manager that the destination logical address is on the fan network, modifying the ARP request.

13. The method of claim 11, wherein the fan network trades an ability to route to a specified address space of a larger network to provide additional logical addresses behind a host logical address.

14. The method of claim 11, wherein the fan network is implemented using Software Defined Networking (SDN).

15. The method of claim 1, wherein the host machine includes a fan switch.

16. The method of claim 15, wherein the fan switch emulates a network switch.

17. The method of claim 15, wherein the fan switch is a software module associated with a destination virtual entity manager that processes packets destined for virtual entities on a fan network associated with the host machine.

18. The method of claim 1, wherein each machine to which the ARP request is not directed ignores the ARP request.

19. A host machine comprising:
   a memory; and
   a physical processor configured to host a plurality of virtual machines, wherein hosting the plurality of virtual machines includes:
      receiving a unicast Address Resolution Protocol (ARP) request from a source virtual entity supported by a source virtual entity manager, the ARP request indicating a logical address corresponding to the host machine, the host machine associated with a destination logical address corresponding to at least one of the plurality of virtual machines;

determining a virtualized physical address responsive to the ARP request, the virtualized physical address identifying a destination virtual machine in the plurality of virtual machines; and forwarding a response to the ARP request to the source virtual entity, the response including the virtualized physical address of the destination virtual machine.

20. A non-transitory computer readable medium storing instructions that, when executed by one or more processors, cause the one or more processors to perform steps comprising:

receiving a unicast Address Resolution Protocol (ARP) request from a source virtual entity supported by a source virtual entity manager, the ARP request indicating a logical address corresponding to a host machine associated with a destination logical address corresponding to a destination virtual entity supported by the host machine;

determining a virtualized physical address responsive to the ARP request, the virtualized physical address identifying the destination virtual entity supported by the host machine; and forwarding a response to the ARP request to the source virtual entity, the response including the virtualized physical address of the destination virtual entity.

* * * * *